United States Patent
Hof et al.

[19]

[11] Patent Number: 6,089,713
[45] Date of Patent: Jul. 18, 2000

[54] SPECTACLE LENS WITH SPHERICAL FRONT SIDE AND MULTIFOCAL BACK SIDE AND PROCESS FOR ITS PRODUCTION

[75] Inventors: Albrecht Hof, Aalen; Adalbert Hanssen, Königsbronn, both of Germany

[73] Assignee: Carl-Zeiss-Stiftung, Germany

[21] Appl. No.: 09/008,260

[22] Filed: Jan. 16, 1998

[30] Foreign Application Priority Data

Jan. 16, 1997 [DE] Germany ............... 197 01 312

[51] Int. Cl.[7] .............................. G02C 7/06
[52] U.S. Cl. ................. 351/169; 351/170; 351/177
[58] Field of Search ............... 351/168, 169, 351/170, 171, 172, 177

[56] References Cited

U.S. PATENT DOCUMENTS

| | | | |
|---|---|---|---|
| 2,878,721 | 3/1959 | Kanolt | 351/169 |
| 3,722,986 | 3/1973 | Luc Andre Marcel Tagnon | 351/176 |
| 4,606,622 | 8/1986 | Fruëter et al. | 351/169 |
| 4,950,057 | 8/1990 | Shirayanagi | 351/169 |
| 5,137,343 | 8/1992 | Kelch et al. | 351/169 |
| 5,444,503 | 8/1995 | Kelch et al. | 351/169 |

FOREIGN PATENT DOCUMENTS

WO 97/13603  4/1997  WIPO .

*Primary Examiner*—Scott J. Sugarman

[57] ABSTRACT

A spectacle lens has a spherical or rotationally symmetrical, aspheric front side and a back side prescription surface. All individual requirements of the prescription for spectacles, consisting of spherical, astigmatic and prismatic power and their distribution on the x and y axes on the spectacle lens surface, are fulfilled by the prescription surface. The back surface of the spectacle lens is a multifocal surface without point symmetry and/or axial symmetry. A process that produces spectacle lenses with multifocal power starts with variants of a first or of a few spectacle lens(es) that originate according to prior art design considerations. The semi-finished lenses have spherical or aspheric, rotationally symmetrical, convex front surfaces, with about 10 different radii. The whole matching of individual required dioptric power takes place on a free-form back surface of the spectacle lens facing the eye of the wearer. The shape of this back surface follows from an individual optimization calculation using the design of the predefined starting surface as the start of the optimization.

8 Claims, 4 Drawing Sheets

SPECTACLE LENS WITH SPHERICAL FRONT SIDE AND MULTIFOCAL BACK SIDE AND PROCESS FOR ITS PRODUCTION

BACKGROUND OF THE INVENTION

1. Field of the Invention

This invention relates to a spectacle lens with a spherical, or rotationally symmetrical aspheric, front side and a back side (prescription surface), and also a process for its production.

Spectacle lenses are divided into those with a single refraction value and those with several, but at least two, different refraction values. The different refraction values serve to enable the wearer with limited or distorted accommodation ability to see faultlessly, at least in the near and far regions.

The different refraction values can occur in discrete steps (bifocal, trifocal) or in a smooth transition as a multifocal surface.

2. Discussion of Relevant Art

Surfaces with variable refraction value are presently preferably formed on the front side of a spectacle lens, due to current production technology and esthetics. A limited number of multiple power surfaces (multifocal surfaces) are used, since an individual tool is required for fine grinding or polishing each kind of surface to be produced. These tools have to be produced, stocked and kept ready, for each kind of surface.

In order to attain, in spite of this, the correct dioptric power (spherical, astigmatic and prismatic) at least at given points of the spectacle lens (in particular at the far and near reference points), the back surface of the spectacle lens is usually provided with a spherical or toric prescription surface that is produced with conventional machines for optical processing. A stronger toric power at the front side of a spectacle lens would be very unsightly.

Spectacle lenses are described, in present terminology, by those values for sphere, astigmatism and prism that the lens achieves at the far and near reference points. Values that deviate from these can be established at all other points of the spectacle lens, so that the dioptric power can be described by functions in x and y coordinates.

It is known that spectacle lens surfaces with multiple refraction show optimum correction results only for a design conformation. If a multiple refraction surface is used with a prescription surface that deviates from the design conformation, image quality is forfeited. In order to prevent this, a process is described, for example in German Laid-Open Patent Document DE 42 10 008 A1 (U.S. Pat. No. 5,444,503), in which an additional free form surface with small deviations from the sphere/torus is also formed on the back side.

Expanded production technological possibilities, in particular a direct processing with Fast-Tool-Servo for producing plastic spectacle lenses, make it possible to produce serviceable optical surfaces, even with strongly asymmetrical shape. No further process steps are then necessary, or only very short process steps with a flat tool (polishing). It is not necessary to use tools which are specially matched to a surface. A large number of different surfaces can thus be produced with a small number of tools by this new technique; this was previously not so.

Alternatively, processes can also be used in which a tool with a geometrically defined (milling) or geometrically undefined (grinding) cutting edge is locally in engagement with the workpiece.

A multifocal spectacle lens is described in U.S. Pat. No. 2,878,721, in which the multifocal surface is preferably present on the back side of the spectacle lens, i.e., the side facing the eye. The other surface has a spherical, toric or cylindrical shape. The multifocal surface is described in the form of regionally defined polynomials which have at least 1. deviative continual, and as far as possible also 2. deviatives p, q, r, s, t continual. In order to obtain a concave surface, as is usually required for the inner side of a spectacle lens, a spherical, toric or cylindrical surface is added to the multifocal surface, so that the power of, e.g., 6 diopters is attained in one region. The adaptation to an individual wearer is carried out explicitly with the first surface.

The addition of different surface portions is described explicitly in column 9, lines 47 ff. No suggestion is given of optimizing the surfaces for individual circumstances.

A spectacle lens with stronger refractive power and predetermined astigmatism is described in German Patent Document DE 18 05 561 (U.S. Pat. No. 3,722,986). A method is given by which astigmatism is corrected by the use of sections of ellipses. The correction strategy is expanded to segmented surfaces whose segments have different refractive powers. In the simplest case, a bifocal lens is obtained; the transition from this to a multifocal lens is effected by increasing the number of sectors.

The sectored surface is formed on the front or back side. Astigmatism can be considered at the front or back side. The sectored surface is either formed on a sphere or on a torus/cylinder. "Tuning" is referred to as the production process, starting from a sphere as a starting surface. A rotationally symmetrical aspheric body is obtained. Matching to the individual use situation is not discussed.

A spectacle lens is described in German Patent Document DE 42 10 008 A1 (U.S. Pat. No. 5,444,503) having a multi-strength surface and a free-form prescription surface.

In the Report of Guilino, Barth, New Progressive Surfaces, DOZ, November 11, 1980, page 20 ff., the construction of a multifocal surface by means of conical sections is described. It is known that the described surfaces were/are formed on the front side of the lens. The back side is configured as a sphere, or torus/cylinder, for matching to the individual case.

SUMMARY OF THE INVENTION

The object of the invention is to provide a spectacle lens that can be quickly produced, according to the individual requirements of the wearer, from a very easily produced lens blank (purely spherical, or rotationally symmetrical aspheric).

This object is attained according to the invention by a spectacle lens, having a spherical or rotationally symmetrical aspheric front surface, and a back surface that serves as the prescription surface. All individual requirements of a prescription for the spectacles consisting of spherical, astigmatic and/or prismatic power and their distribution over the prescription surface of the spectacle lens are fulfilled on the back surface, and the back surface is a multifocal surface without point symmetry and/or axial symmetry.

Spectacle lenses with multifocal power are produced from semi-finished lenses with a spherical or rotationally symmetrical aspheric front surface with a few different radii, such that the whole individual matching of required dioptric power takes place on the back surface of the spectacle lens. This process according to the invention allows very inexpensive production.

Deviating from the solution that is normally practiced for spectacle lenses with multifocal power, the front side of the spectacle lens according to the invention always has a spherical surface, or a simple rotationally symmetrical aspheric surface. The curvature of the finished spectacle lens is essentially determined by the front surface.

The back side is an individually optimized multifocal prescription surface that fulfills the dioptric correction requirements in terms of spherical, astigmatic and prismatic action for the respective prescribed use conditions. Included in this, in particular, is the stronger power in the near region that is required in ametropia suffered by the elderly.

The spectacle lens according to the invention has a spherical or rotationally symmetrical aspheric front side and a multifocal back side (prescription surface) formed according to the invention.

According to the invention, all the individual requirements of the prescription for spectacles, consisting of spherical, astigmatic and prismatic action and their distribution in x and y over the spectacle lens, are fulfilled by the prescription surface.

It is also of particular interest to combine toric power with multifocal action on the back side.

Due to unfavorable esthetics, none of the individual requirements of the prescription for spectacles are effected on the front side of the spectacle lens.

The spectacle lens according to the invention has no point symmetry or axial symmetry on the back side of the lens, but has multifocal properties.

The lens advantageously has a back surface that results from adding a spherical or toric power portion to a bifocal, trifocal, or multifocal portion.

It is advantageous if, beginning with predefined starting surfaces, an individual optimization of the dioptric values (sphere, astigmatism, prism) takes place on the surface of the spectacle lens facing the wearer's eye, wherein the target functions for sphere, astigmatism and prism, or functions derived from these, and their weighting, are chosen depending upon the results obtained in designing the predefined starting surfaces. A spectacle lens is frequently optimized at a finite number of points that lie close enough for the design to be correct also between the points. By optimization at a finite number of points, the problem can be linearized, and can be solved using least square errors, as an overdetermined system of equations. It is also possible to carry out an optimization at all points. However, this means that error integrals must be solved, and methods of the calculus of variation must be used. An optimization at a finite number of points that lie close together is simpler than an optimization at all points of the surface, and provides comparable results.

The prismatic secondary effects may also be advantageously individually equalized in the course of the optimization calculation, according to the requirements for binocular vision. Possible different dioptric powers for the right and left eyes may be taken into account.

The individual distance between pupils is advantageously also included in the optimization calculation.

The process according to the invention for producing spectacle lenses with multifocal power is characterized in that the variants of a first or a few spectacle lens(es), which arise/arose from previously carried out design considerations, are produced from semi-finished goods with spherical, or rotationally symmetrical aspheric, convex front surfaces and with about 10 different radii, such that the whole individually required dioptric power matching takes place on a free-form surface on the side of the spectacle lens facing the wearer's eye, and the shape of this surface results from an optimization calculation with the use of the design results as a beginning for optimization.

It is advantageous if, starting from a previously determined starting surface, an individual optimization of the free-form surface is carried out, so that the dioptric prescription values (sphere, astigmatism, prism) are attained at the measurement points. The similarity of the resulting surface to the starting surface is ensured by the starting surface itself, the form of the discrete or continuous target functions, and the discrete or continuous weighting functions.

Furthermore, it is advantageous if a corresponding number of fitting holders that is equal to or less than the number of front surface radii is present to receive the blanks with spherical or rotationally symmetrical convex front surfaces for machining the back surface, so that mounting takes place without further auxiliary materials.

BRIEF DESCRIPTION OF THE DRAWINGS

Preferred embodiments of the invention will now described, taken together with the drawings, in which.

In a first embodiment of the invention, the dioptric power of a multifocal surface, or a bifocal surface, or a trifocal surface, and of a spherical and toric back surface, which are at present divided between the front and back sides of a spectacle lens, are added and are applied to the back side, taking account of the power of the spherical front side.

In a second embodiment, a requirement profile for the spectacle lens is formulated, and consists of dioptric nominal power (spherical, astigmatic, prismatic) at different points distributed over the lens, or for the whole surface. This includes the nominal power at the near and far reference points.

The prismatic power is usually provided at only one point or a few points. The requirement profile can be given by functions over x and y or as lists of powers at a finite number of points.

An individual optimization of the prescription surface is carried out for the target data, so that the target data are attained in the sense of a best fit. In the calculated solution, the individual portions: sphere, torus/cylinder, prism, are different in different regions of the spectacle lens. This property is achieved only by shaping the back surface.

The front side is spherical or has a simple, rotationally symmetrical aspheric construction.

The usual starting values have to be provided for the solution of the optimization task. This is to take place in that a draft design for a case of use situated in the neighborhood in the parameter region is provided at different support points that do not lie too close together with defined spherical, astigmatic and prismatic powers as starting values.

Such a starting design likewise appropriately takes account of the equalization of prismatic side effects which is required for undisturbed binocular vision, and particularly those in the vertical direction, as is described in German Granted Patent DE-PS 30 16 935 (U.S. Pat. No. 4,606,622).

These data are calculated in a separate design step, with a given weighting of the individual target magnitudes, and are stored in the computer. It is now possible to calculate a new optimization for each individual case of use. This leads to a matching of the starting surface to the individual prescription, wherein the similarity of the resulting surface to the design family is insured by the starting surfaces, the form of the target functions, and the weighting functions.

Image defects are achieved compulsorily at the passage between the near and far regions. To distribute them over the glass favorably is the real design process. With the introduced procedure the minimum of image defects achieved in the design process is optimally realized with only one free formed surface, independent of the required special spherical, astigmatic or prismatic power.

The requirements for the special optimization include, for example:

individual dioptric values at the far and near points (left/right)

cornea-vertex distance different required characteristic magnification, right/left (aniseikonia)

forward inclination of frame form of the frame centering pupillary distance special situations of use different powers for right and left eye, with effects on the equalization of prismatic side-effects.

"Optimization according to special situations of use" means here that different families of surface designs are formed.

A design family is, in the sense of this invention, a set of one or a few freely formable starting surfaces and mathematically described evaluations for the deviations from the target data of the dioptric power of the spectacle lens to be produced. Furthermore, there is associated with the design a mathematically described rule for which prescription requirement, which of the coarsely stepped standard front sides, which starting surface, and which evaluations, are to be used for the optimization.

Usually, this invention enables a manufacturer to produce in a cost-effective manner, not only a universal multifocal spectacle lens family, but also special solutions for display screen work, for car drivers, and for other special requirements.

Such an optimization process starting from coarsely stepped starting surfaces can be prepared in advance such that it provides reasonable results for all regions of the usual prescriptions, without the intervention of a technician who is experienced in design.

In the case of a greatly different size perception of both eyes (aniseikonia), or other uncommon strong deviations between the two eyes, an improvement can be attained by individual optimization. The intervention of a technician who is experienced in design is necessary in this case.

Figure 1:
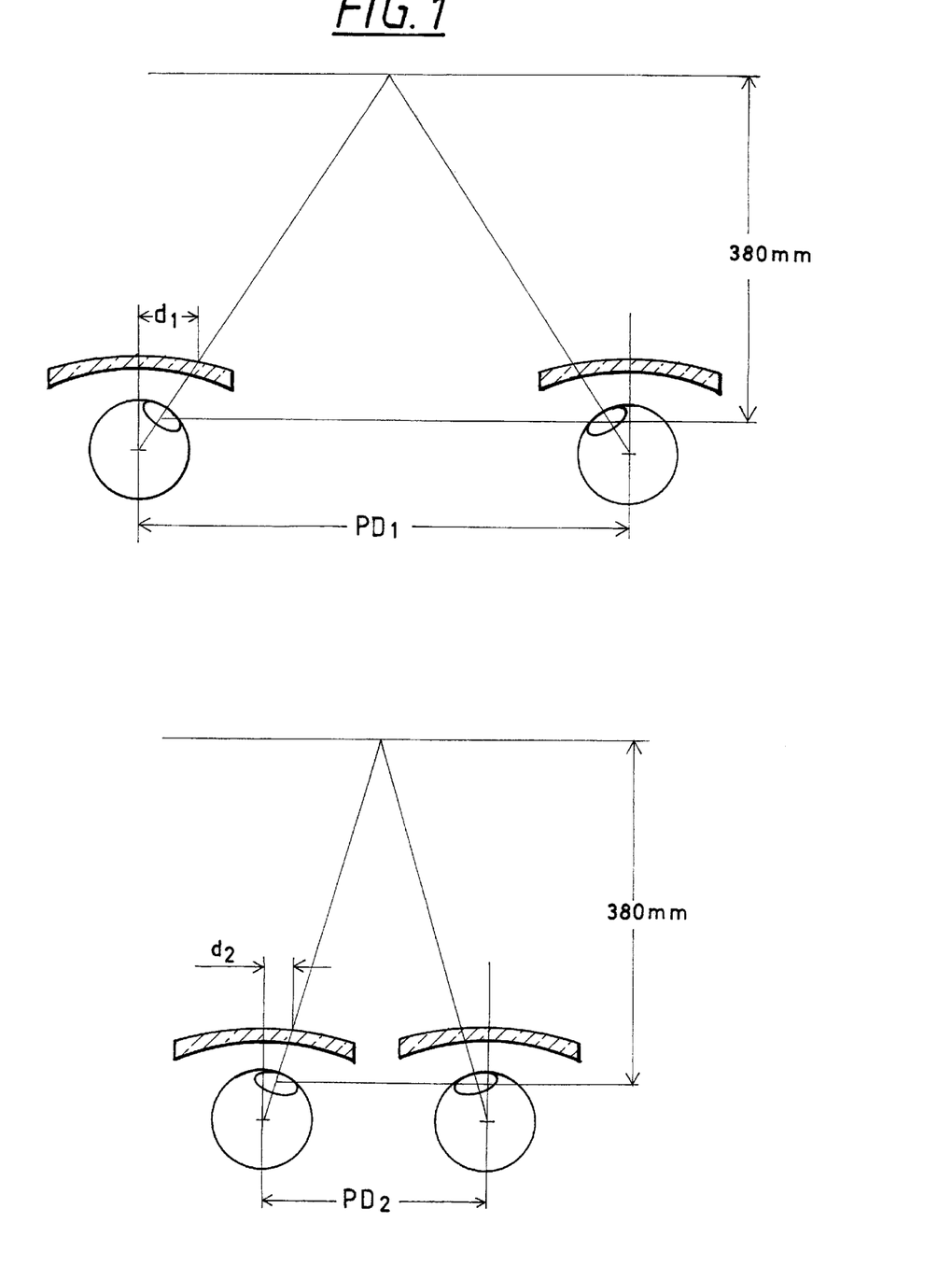
FIG. 1 shows a schematic representation of the standard pupillary distance.

Multifocal lenses are at present always designed for a standard pupillary distance. The order of magnitude of the deviation from the optimum situation is shown in FIG. 1.

Since multifocal lenses should not have twisting built-in, the method of defined twisting which is used for bifocal or trifocal lenses is not available. Matching to the individual prescription value can be attained by a special optimization of the free-form surface (back surface of the spectacle lens).

A particular advantage of the inventive solution, from the production-technical point of view is that standard clamping tools, for example, vacuum clamps with a matched clamping surface, can be used for holding the blanks that have spherical, or else rotationally symmetrical aspheric, front faces in the processing machine.

Figure 2A:
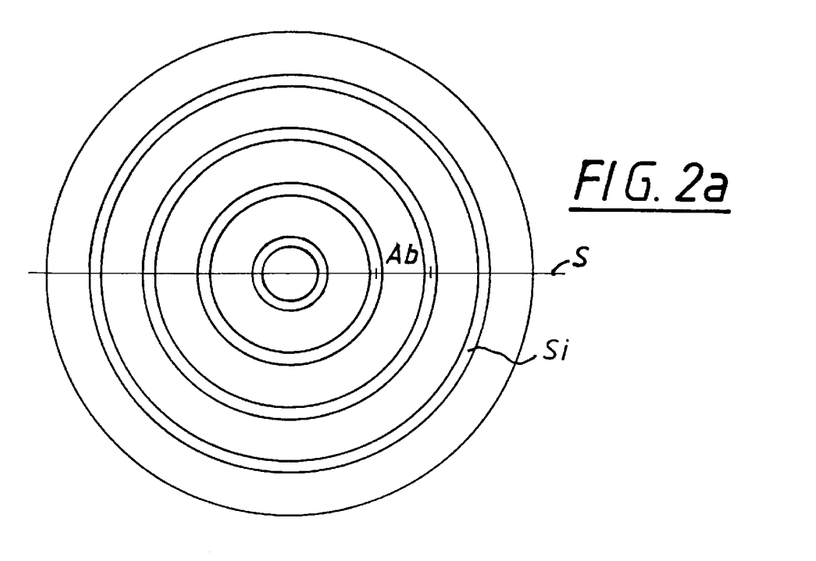
FIG. 2a shows a plan view of a vacuum clamp.
Figure 2B:
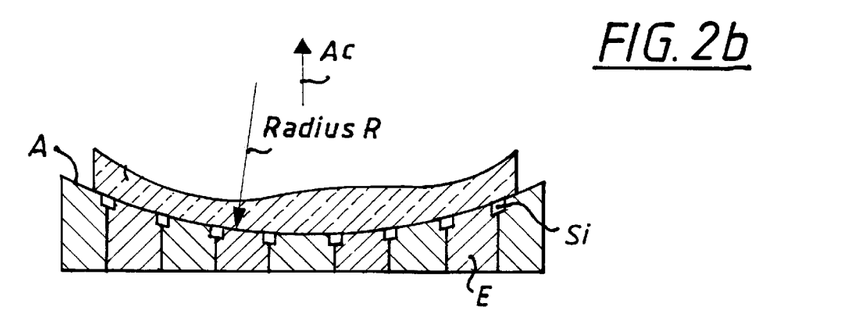
FIG. 2b shows a vacuum clamp in side view, with a spectacle lens in place.

An embodiment of such a clamp with a fixed radius R of the support surface is shown in FIGS. 2a and 2b. Annular grooves Si are formed in the support surface A, and a vacuum can be produced in them.

In another embodiment, depressions can be distributed over the support surface, instead of grooves, and the depressions can be evacuated.

If the distance Ab between the grooves is made small, and in addition the annular support elements E are formed to be displaceable in the axial direction Ac with respect to each other, the radius R can be varied, so that blanks with different radii R can be held on the front side of a single clamping tool.

The centering of the blanks can take place with an additional centering device, e.g., one consisting of three centering pins which pivot against the edge of the blank. Alternatively, work can proceed to the edge of the blank completely without centering, and instead marks can be applied to the surface during processing, and can permit an additional orientation of the spectacle lens, e.g., for grinding to fit into the spectacle frame.

In a further embodiment, shaped parts to bridge over the radius differences can be placed in a standard support.

The expensive block process with low-melting heavy metal alloys, which is required at present, can be dispensed with. Since only a limited number of front surface radii, e.g. 10, is required, individual processing machines can each be associated with a given front surface radius and can perform this section of the program.

The invention is in particular well practiced with direct processing. It is thereby possible to produce optical free-form surfaces which are ready for use, or nearly ready for use.

In direct processing, as is described in the German Patent Application DE 19 538 274 (International Patent Document WO97/13603), the starting point is a turning process.

Alternatively, processes with defined (milling) or undefined (grinding) cutters are conceivable.

It is important for the tool to be only very locally engaged with the workpiece. The processing machine must fulfill certain requirements in terms of precision in this case.

The optical powers of a delivery program from Sph+10 dpt to −10 dpt can be accommodated in, for example, 10 regions with different deflection.

This means that only 10 spherical front surfaces are required, and all the multifocal lens programs for different applications that are provided for this material can then be produced. The reduction in stockholding is obvious.

Blocking is dispensed with in the production process; a vacuum clamp, for example, can be provided for each front surface radius. Surface refinements, such as for example to provide responsiveness to light intensity, can already be applied or related to the front side in the semi-finished article.

If necessary, the number of programs can easily be expanded, since only the corresponding basic design has to be produced in the computer.

Figure 3:
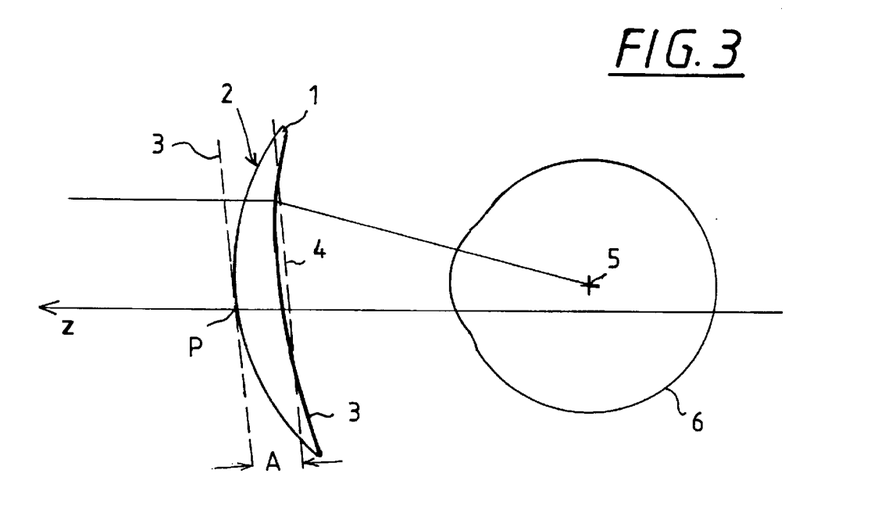
FIG. 3 shows a schematic illustration of the spectacle lens according to the invention in front of the wearer's eye.

The example that follows represents a calculation for a spectacle lens (1 in FIG. 3) according to the invention, the following data being taken into consideration:

| | |
|---|---|
| power in far region: | sph 2.5 dpt, cyl 2.0 dpt, axis 45° |
| addition: | 2.0 dpt |
| refractive index of the lens material: | 1.600 |
| lens diameter: | 60 mm |
| minimum edge thickness of the lens: | 0.5 mm |
| radius of the front surface of the lens: | 92.308 mm |
| (corresponds to a surface refraction value of 6.5 dpt) | |

[where sph = sphere, cyl = cylinder, dpt = diopter].

The front surface (2) is a spherical surface, wherein the following holds for the position of the reference points (data seen from in front with reference to the geometrical center):

| | |
|---|---|
| Far reference point: | (2.5   7.0) |
| Near reference point: | (5.0  −14.0) |
| Centering cross: | (2.5   4.0) |

The spherical front surface (2) touches the base plane (3') that is tilted by 6 degrees, at the point P (2.5 4.0). Thus the front surface (2) has a forward inclination of about 9 degrees with respect to a suitable frame. The back surface (3) is an optimized multifocal surface. The base planes (3', 4) of the front surface (2) and the back surface (3) are both inclined forward by 60°, and have a mutual spacing A of 4.1 mm to each other. The distance of the back surface (3) to the rotation point (5) of the eye (6) is 27.5 mm. These properties are shown illustratively in FIG. 3.

Figure 4A:
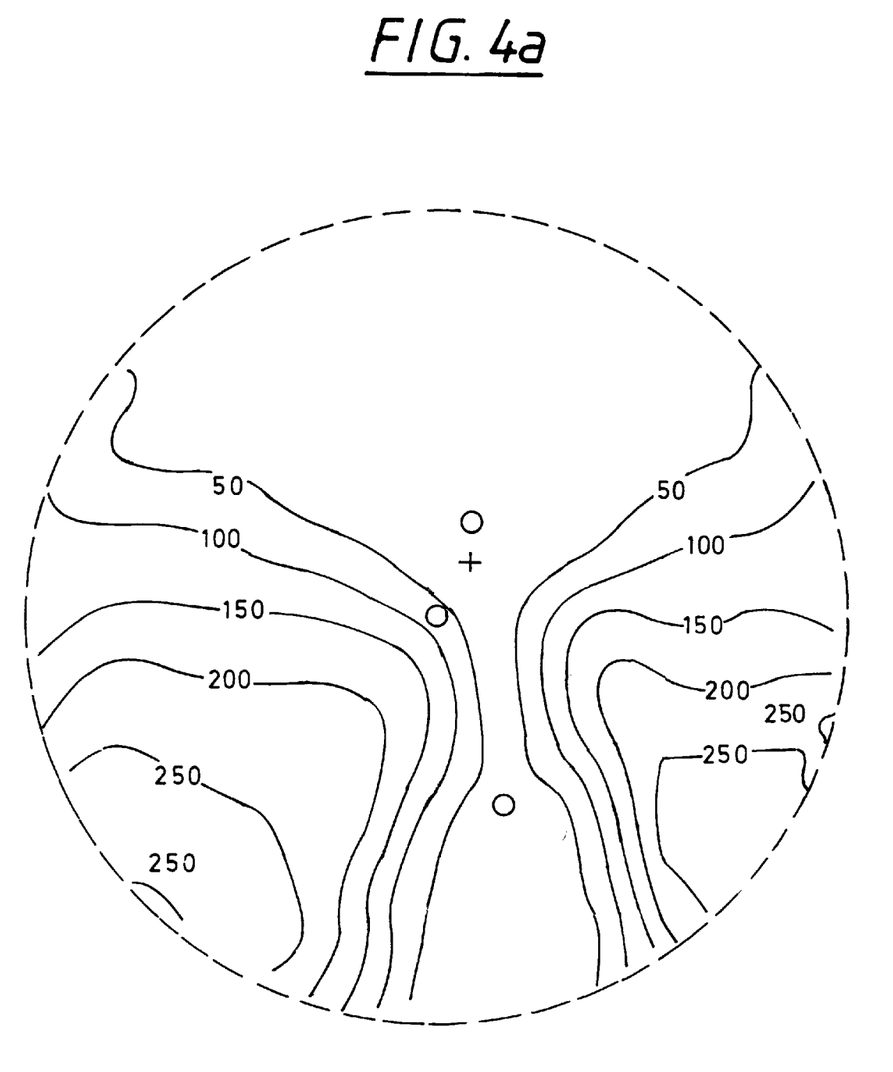
FIG. 4a shows an illustration of the astigmatic deviation of the spectacle lens according to the invention.
Figure 4B:
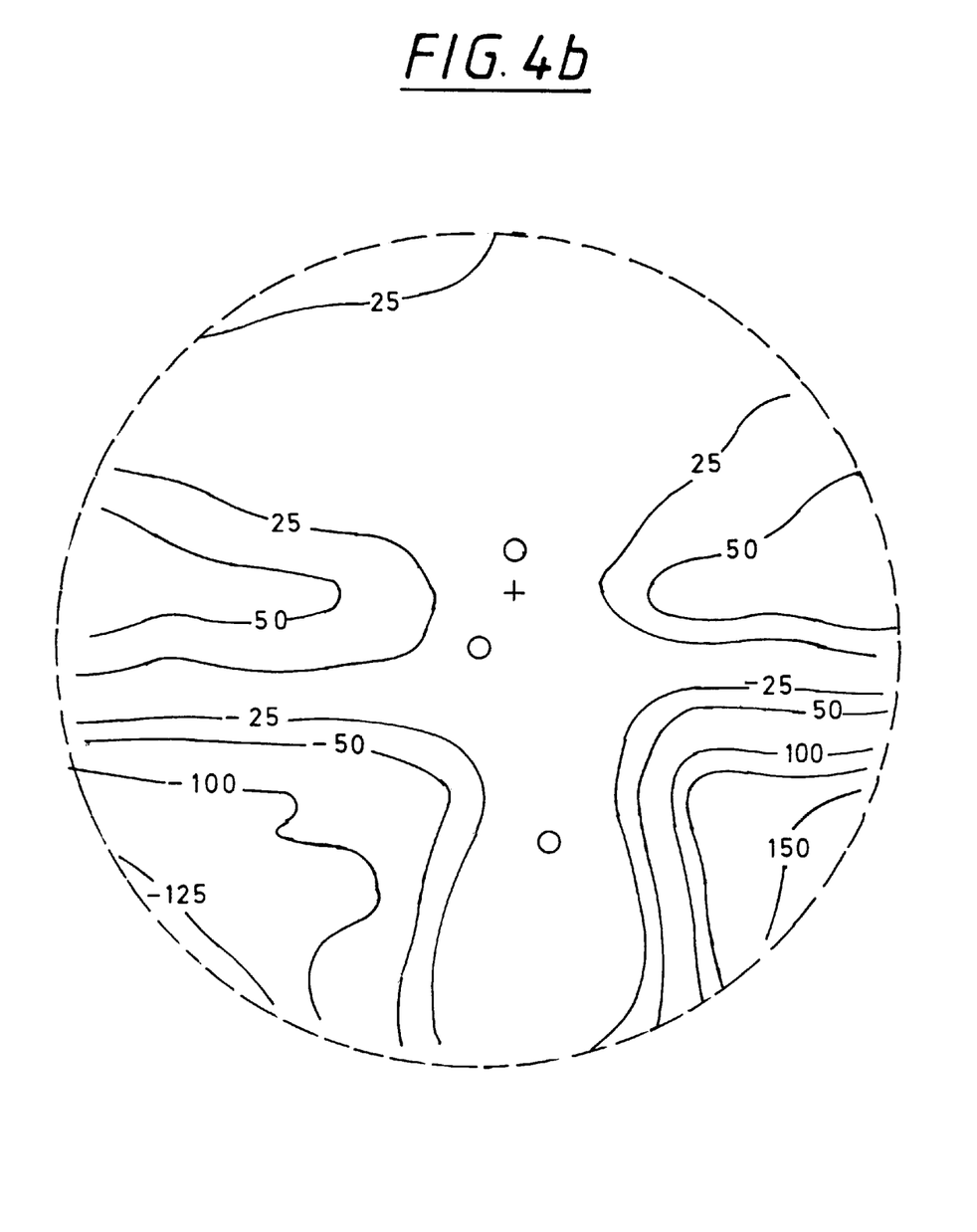
FIG. 4b shows an illustration of the spherical deviation of the spectacle lens according to the invention.

In addition, the astigmatic deviation of the lens is shown in FIG. 4a, and the spherical deviation of the lens is shown in FIG. 4b, for the lens of the example according to the invention.

The following tables represent the height of the sagittas (or crown height) of the back surface (3), and with it the multifocal surface, wherein the heights of the sagittas seen from the front are with respect to a base plane which is tilted through 6 degrees. The grid spacing is 3.0 mm and the lens diameter is 60.0 mm. From this, calculation gives the following values:

Left half of the back side (3) of the lens:

| Y/X: | −30.0 | −27.0 | −24.0 | −21.0 | −18.0 | −15.0 | −12.0 | −9.0 | −6.0 | −3.0 | .0 |
|---|---|---|---|---|---|---|---|---|---|---|---|
| 30.0: | | | | | | | | | | | −.9994 |
| 27.0 | | | | | | | −.8221 | −.7178 | −.6648 | −.6632 | −.7130 |
| 24.0: | | | | | −1.0034 | −.7891 | −.6259 | −.5137 | −.4525 | −.4422 | −.4822 |
| 21.0: | | | | −1.1475 | −.8764 | −.6556 | −.4852 | −.3651 | −.2955 | −.2762 | −.3061 |
| 18.0: | | | −1.4077 | −1.0810 | −.8041 | −.5767 | −.3989 | −.2708 | −.1925 | −.1635 | −.1830 |
| 15.0: | | | −1.3995 | −1.0680 | −.7853 | −.5513 | −.3661 | −.2300 | −.1425 | −.1031 | −.1116 |
| 12.0: | | −1.8252 | −1.4420 | −1.1060 | −.8178 | −.5776 | −.3855 | −.2414 | −.1447 | −.0944 | −.0910 |
| 9.0: | | −1.9175 | −1.5312 | −.1914 | −.8988 | −.6535 | −.4555 | −.3039 | −.1980 | −.1366 | −.1207 |
| 6:0: | | −2.0518 | −1.6630 | −1.3203 | −1.0245 | −.7755 | −.5725 | −.4143 | −.2997 | −.2277 | −.1993 |
| 3.0: | | −2.2249 | −1.8339 | −1.4887 | −1.1904 | −.9382 | −.7311 | −.5675 | −.4461 | −.3652 | −.3253 |
| −0: | −2.8720 | −2.4347 | −2.0412 | −1.6933 | −1.3919 | −1.1363 | −.9252 | −.7572.6308 | | −.5435 | −.4948 |
| −3.0: | | −2.6775 | −2.2803 | −1.9287 | −1.6235 | −1.3639 | −1.1487 | −.9767 | −.8466 | −.7557 | −.7017 |
| −6.0: | | −2.9471 | −2.5457 | −2.1903 | −1.8813 | −1.6179 | −1.3989 | −1.2233 | −1.0902 | −.9968 | −.9391 |
| −9.0: | | −3.2425 | −2.8368 | −2.4779 | −2.1653 | −1.8980 | −1.6751 | −1.4959 | −1.3596 | −1.2634 | −1.2015 |
| −12.0: | | −3.5642 | −3.1541 | −2.7916 | −2.4754 | −2.2041 | −1.9771 | −1.7937 | −1.6536 | −1.5534 | −1.4849 |
| −15.0: | | | −3.4983 | −3.1320 | −2.8120 | −2.5365 | −2.3049 | −2.1169 | −1.9721 | −1.8666 | −1.7896 |
| −18.0: | | | −3.8709 | −3.5005 | −3.1762 | −2.8963 | −2.6605 | −2.4679 | −2.3172 | −2.2044 | −2.1179 |
| −21.0: | | | | −3.9000 | −3.5699 | −3.2852 | −3.0450 | −2.8476 | −2.6901 | −2.5676 | −2.4706 |
| −24.0: | | | | | −3.9948 | −3.7037 | −3.4582 | −3.2549 | −3.0894 | −2.9564 | −2.8482 |
| −27.0: | | | | | | | −3.9006 | −3.6896 | −3.5153 | −3.3716 | −3.2524 |
| −30.0: | | | | | | | | | | | −3.6852 |

Right half of the back side (3) of the lens:

ally equalized according to binocular vision requirements

| Y/X: | 3.0 | 8.0 | 9.0 | 12.0 | 15.0 | 18.0 | 21.0 | 24.0 | 27.0 | 30.0 |
|---|---|---|---|---|---|---|---|---|---|---|
| ⋮ | | | | | | | | | | |
| 30.0: | | | | | | | | | | |
| ⋮ | | | | | | | | | | |
| 27.0: | −.8132 | −.9623 | −1.1607 | −1.4086 | | | | | | |
| ⋮ | | | | | | | | | | |
| 24.0: | −.5718 | −.7101 | −.8972 | −1.1332 | −1.4171 | −1.7477 | | | | |
| ⋮ | | | | | | | | | | |
| 21.0: | −.3846 | −.5116 | −.6871 | −.9106 | −1.1813 | −1.4983 | −1.8614 | | | |
| ⋮ | | | | | | | | | | |
| 18.0: | −.2505 | −.3659 | −.5288 | −.7390 | −.9960 | −1.2989 | −1.6474 | −2.0418 | | |
| ⋮ | | | | | | | | | | |
| 15.0: | −.1679 | −.2714 | −.4213 | −.6175 | −.8600 | −1.1479 | −1.4809 | −1.8589 | | |
| ⋮ | | | | | | | | | | |
| 12.0: | −.1353 | −.2264 | −.3629 | −.5448 | −.7718 | −1.0435 | −1.3598 | −1.7209 | −2.1269 | |
| ⋮ | | | | | | | | | | |
| 9.0: | −.1517 | −.2292 | −.3520 | −.5191 | −.7295 | −.9833 | −1.2815 | −1.6246 | −2.0126 | |
| ⋮ | | | | | | | | | | |
| 6.0: | −.2165 | −.2795 | −.3873 | −.5381 | −.7303 | −.9646 | −1.2432 | −1.5671 | −1.9357 | |
| ⋮ | | | | | | | | | | |
| 3.0: | −.3288 | −.3764 | −.4669 | −.5985 | −.7699 | −.9829 | −1.2407 | −1.5446 | −1.8941 | |
| ⋮ | | | | | | | | | | |
| .0: | −.4862 | −.5174 | −.5874 | −.6955 | −.8435 | −1.0345 | −1.2714 | −1.5554 | −1.8861 | −2.2634 |
| ⋮ | | | | | | | | | | |
| −3.0: | −.6833 | −.6984 | −.7461 | −.8283 | −.9509 | −1.1194 | −1.3354 | −1.5993 | −1.9112 | |
| ⋮ | | | | | | | | | | |
| −6.0: | −.9128 | −.9129 | −.9393 | −.9959 | −1.0926 | −1.2380 | −1.4328 | −1.6765 | −1.9691 | |
| ⋮ | | | | | | | | | | |
| −9.0: | −1.1672 | −1.1539 | −1.1618 | −1.1958 | −1.2683 | −1.3908 | −1.5642 | −1.7874 | −2.0605 | |
| ⋮ | | | | | | | | | | |
| −12.0: | −1.4405 | −1.4147 | −1.4079 | −1.4246 | −1.4768 | −1.5778 | −1.7302 | −1.9336 | −2.1881 | |
| ⋮ | | | | | | | | | | |
| −15.0: | −1.7338 | −1.6963 | −1.6776 | −1.6807 | −1.7161 | −1.7982 | −1.9315 | −2.1164 | | |
| ⋮ | | | | | | | | | | |
| −18.0: | −2.0509 | −2.0022 | −1.9726 | −1.9642 | −1.9858 | −2.0517 | −2.1681 | −2.3360 | | |
| ⋮ | | | | | | | | | | |
| −21.0: | −2.3925 | −2.3331 | −2.2933 | −2.2755 | −2.2864 | −2.3389 | −2.4403 | | | |
| ⋮ | | | | | | | | | | |
| −24.0: | −2.7593 | −2.6896 | −2.6406 | −2.6150 | −2.6182 | −2.6605 | | | | |
| ⋮ | | | | | | | | | | |
| −27.0: | −3.1528 | −3.0733 | −3.0160 | −2.9840 | | | | | | |
| ⋮ | | | | | | | | | | |
| −30.0: | | | | | | | | | | |

What is claimed is:

1. A spectacle lens, comprising:
    a spherical or rotationally symmetrical aspheric front surface, and
    a back surface that serves as a prescription surface and is individually optimized in order to fulfill all individual requirements of a prescription for spectacles excluding 0 diopters, including spherical, astigmatic or prismatic power and distribution of said requirements over said prescription surface, said back surface comprising a multifocal surface without point symmetry or axial symmetry.

2. The spectacle lens according to claim 1, wherein said back surface (3) is shaped such that it results from addition of a spherical or toric power portion to a bifocal or trifocal portion.

3. A spectacle lens according to claim 1, wherein said lens is individually optimized for a wearer of said spectacle lens with respect to sphere, astigmatism, and prism dioptric values at all points of said back surface (3) that faces said wearer's eye (6).

4. A spectacle lens according to claim 1, wherein in an optimization calculation, prismatic side effects are individually equalized according to binocular vision requirements and possible different dioptric powers for the right and left eye (6) of the wearer are taken into account.

5. A spectacle lens according to claim 1, wherein an individual distance of a wearer's pupils from each other is taken into account in an optimization calculation.

6. A process for producing spectacle lenses with multifocal power, comprising:
    employing semi-finished lenses having spherical or rotationally symmetrical aspheric front surface with a few different radii, and
    matching all individually required dioptric power, excluding 0 diopters, at a back surface of said spectacle lens said back surface comprising a multifocal surface without point symmetry and/or axial symmetry.

7. The process for producing spectacle lenses according to claim 6, further comprising carrying out at least one individual optimization for a wearer of the spectacle lens on said back surface so that sphere, astigmatism, and prism dioptric prescription values are established at all points on said back surface facing a wearer's eye.

8. A spectacle lens, comprising:
    a spherical or rotationally symmetrical aspheric front surface, and a back surface that serves as a prescription surface and is individually optimized in order to fulfill all individual requirements of a prescription for spectacles, excluding 0 diopters, including spherical, astigmatic or prismatic power and distribution of said requirements over said prescription surface, said back surface comprising a multifocal surface without point symmetry and axial symmetry.

* * * * *

US006089713C1

(12) EX PARTE REEXAMINATION CERTIFICATE (10234th)
United States Patent
Hof et al.

(10) Number: US 6,089,713 C1
(45) Certificate Issued: Jul. 31, 2014

(54) SPECTACLE LENS WITH SPHERICAL FRONT SIDE AND MULTIFOCAL BACK SIDE AND PROCESS FOR ITS PRODUCTION (75) Inventors: Albrecht Hof, Aalen (DE); Adalbert Hanssen, Königsbronn (DE)

(73) Assignee: Carl Zeiss Vision International GmbH, Aalen (DE)

Reexamination Request:
No. 90/012,983, Oct. 4, 2013

Reexamination Certificate for:
Patent No.: 6,089,713
Issued: Jul. 18, 2000
Appl. No.: 09/008,260
Filed: Jan. 16, 1998

(30) Foreign Application Priority Data

Jan. 16, 1997 (DE) .................................. 197 01 312

(51) Int. Cl.
*G02C 7/06* (2006.01)
(52) U.S. Cl.
USPC ..................................................... 351/159.47
(58) Field of Classification Search
None
See application file for complete search history.

(56) References Cited

To view the complete listing of prior art documents cited during the proceeding for Reexamination Control Number 90/012,983, please refer to the USPTO's public Patent Application Information Retrieval (PAIR) system under the Display References tab.

*Primary Examiner* — Deandra Hughes (57) ABSTRACT

A spectacle lens has a spherical or rotationally symmetrical, aspheric front side and a back side prescription surface. All individual requirements of the prescription for spectacles, consisting of spherical, astigmatic and prismatic power and their distribution on the x and y axes on the spectacle lens surface, are fulfilled by the prescription surface. The back surface of the spectacle lens is a multifocal surface without point symmetry and/or axial symmetry. A process that produces spectacle lenses with multifocal power starts with variants of a first or of a few spectacle lens(es) that originate according to prior art design considerations. The semi-finished lenses have spherical or aspheric, rotationally symmetrical, convex front surfaces, with about 10 different radii. The whole matching of individual required dioptric power takes place on a free-form back surface of the spectacle lens facing the eye of the wearer. The shape of this back surface follows from an individual optimization calculation using the design of the predefined starting surface as the start of the optimization.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 is confirmed.

New claims 9-23 are added and determined to be patentable.

*9. A spectacle lens according to claim 1, wherein a cornea-vertex distance of a wearer is taken into account in an optimization calculation.*

*10. A spectacle lens according to claim 1, wherein a forward inclination of a spectacle frame on a wearer is taken into account in an optimization calculation.*

*11. A pair of spectacle lenses each according to claim 1, wherein individual dioptric values at a far and a near point on each of the left and right lenses are taken into account in an optimization calculation.*

*12. A spectacle lens according to claim 1, wherein a form of the wearer's spectacle frame is taken into account in an optimization calculation.*

*13. The process of claim 6, wherein the matching of all individually required dioptric power on said back multifocal surface includes carrying out at least one individual optimization for a wearer of the spectacle lens so that all individually required dioptric power is distributed over said prescription surface.*

*14. The process of claim 13, wherein a pupillary distance of a wearer is taken into account in an optimization calculation.*

*15. The process of claim 13, wherein a cornea-vertex distance of a wearer is taken into account in an optimization calculation.*

*16. The process of claim 13, wherein a forward inclination of a spectacle frame on a wearer is taken into account in an optimization calculation.*

*17. The process of claim 13, wherein individual dioptric values at a far and a near point on each of the left and right lenses are taken into account in an optimization calculation for producing a pair of spectacle lenses.*

*18. The process of claim 13, wherein a form of the wearer's spectacle frame is taken into account in an optimization calculation.*

*19. A spectacle lens according to claim 8, wherein a pupillary distance of a wearer is taken into account in an optimization calculation.*

*20. A spectacle lens according to claim 8, wherein a cornea-vertex distance of a wearer is taken into account in an optimization calculation.*

*21. A spectacle lens according to claim 8, wherein a forward inclination of a spectacle frame on a wearer is taken into account in an optimization calculation.*

*22. A pair of spectacle lenses, each according to claim 8, wherein individual dioptric values at a far and a near point on each of the left and right lenses are taken into account in an optimization calculation.*

*23. A spectacle lens according to claim 8, wherein a form of the wearer's spectacle frame is taken into account in an optimization calculation.*

\* \* \* \* \*